Patented Mar. 10, 1936

2,033,718

UNITED STATES PATENT OFFICE 2,033,718

CONDENSATION PRODUCTS OF THE CARBAMIDE - FORMALDEHYDE TYPE AND PROCESS OF MAKING SAME

Wilhelm Kraus, Vienna, Austria

No Drawing. Application May 14, 1934, Serial No. 725,660. In Germany May 18, 1933

6 Claims. (Cl. 260—3)

This invention relates to non-hardening condensation products of the carbamide-formaldehyde type containing hexamethylenetetramine as a constituent and it comprises the manufacture of said condensation products and the new products themselves.

The condensation products from urea or a derivative thereof and formaldehyde, so far proposed in literature for practical application, are, without exception, capable of being hardened, that is to say may pass from a fusible, soluble condition into infusible, insoluble compounds under the action of high temperatures.

This invention relates to the production of compounds which, in contrast with the urea-formaldehyde condensation products hitherto known, either remain completely soluble in water, even when stored for a long time and when subjected to prolonged heating, or yield with water jellies which always again melt when heated, resembling animal glue in this respect. Both kinds of compounds may be dried with or without exposure to heat without detriment to their solubility in water or their tendency to form jellies.

These condensation products are made by condensation of urea, either alone or in admixture with other compounds capable of reacting with formaldehyde, formaldehyde and hexamethylenetetramine.

The conditions under which it is possible to impart to urea-formaldehyde compounds properties which differ wholly from those which are usual are as follows:—

1. Fundamental for the production of compounds of the aforesaid properties is the proportion between the hexamethylenetetramine and the urea, which can be varied only within narrow limits; if these limits are overstepped, one enters the region of the production of compounds capable of being hardened and no longer soluble.

When working with acid contact agents there begins from about the proportion 1 mol. hexamethylenetetramine to 6 mol. urea upwards, the formation of compounds which cannot be dissolved with certainty; in any case at a proportion of 1 mol. hexamethylenetetramine to 7 mol. urea there are already produced compounds which after prolonged heat-treatment harden and never again swell or soften in hot water. If acid contact agents be omitted the limits are somewhat shifted, but in any case at a proportion of 1 mol. hexamethylenetetramine to 10 mols. urea compounds are produced by prolonged heat-treatment which are not capable of being hardened but are also no longer soluble in hot water. The hexamethylenetetramine may be added in several portions and at different stages of the process. By a secondary addition of hexamethylenetetramine to a primarily formed water soluble product or fusible jelly the viscosity of the former or the softening point of the latter may be lowered. Instead of using hexamethylenetetramine this body can be allowed to form from ammonia and formaldehyde in the solution.

2. The proportion between urea and formaldehyde is of importance within the limits laid down under 1 above for the kind of compounds produced. By using small proportions of formaldehyde, about from the proportion 1 mol. urea to 1 mol. formaldehyde to the proportion 1 mol. urea to 1.5 mol. formaldehyde and an acid catalyst, there are obtained compounds which remain soluble and have no tendency to gelatinize; if this proportion of formaldehyde is exceeded there are produced in presence of acid catalysts reversible jellies. Preferably the proportion of formaldehyde does not essentially exceed 2 molecules for 1 mol. of urea.

3. Of quite different importance is, within the conditions laid down under 1 above, the hydrogen-ion concentration of the parent formaldehyde. It has been found suitable to select as the minimum hydrogen-ion concentration one which exceeds a pH-value of 3.0. Whereas without use of an acid catalyst the production of reversible jellies under the conditions of reaction hitherto described is not to be observed, it is possible by adjustment of the hydrogen-ion concentration to vary the properties of the jellies and solutions produced. By increasing the hydrogen-ion concentration it is easy to regulate the temperature at which the jellies soften and the viscosity of the solutions. The desired hydrogen-ion concentration may be obtained by inorganic or organic acids or acid salts. As examples of suitable acid catalysts there may be mentioned sulfuric acid, phosphoric acid, acetic acid, oxalic acid, citric acid, potassium bitartrate, and so on.

4. By adding other materials the nature of the jellies may be essentially influenced, the conditions falling within the limits set forth under 1 above. The added substance may be a chemically well defined compound which reacts with formaldehyde, such as thiourea, phenol, urethane, acetamide, oxamide, aniline, or the like, or it may be a natural substance of high molecular weight, such as starch, gum arabic, animal glue, tragacanth or the like. Generally added substances of the first kind determine an increase of the jelly formation.

5. Temperature also plays a part. Whereas at low temperatures even the highest content of hexamethylenetetramine produces without exception completely colorless compounds, there are produced up to a proportion of 1 mol. hexamethylenetetramine to 4 mol. urea at the boiling temperature and with the addition of an acid catalyst yellow compounds. The jelly formation appears to be favored by low temperatures.

Since the conditions set forth under 1–5 above may overlap, the limits named under 1–5 above cannot be regarded as very sharp.

The limits of proportion between urea and hexamethylenetetramine on the one hand and urea and formaldehyde on the other hand are shifted in the sense that by diminishing the proportion of formaldehyde below the ratio 1 mol. urea to 1 mol. formaldehyde, the necessary proportion of hexamethylenetetramine per 1 mol. urea can be diminished. For example, when 1 mol. urea is condensed with ½ mol. formaldehyde the proportion of hexamethylenetetramine can be reduced to 1/30–1/60 mol., with respect to the urea, without sacrificing the characteristic of not hardening in the final product.

By the conditions stated in 1–5, however, the well defined region of compounds which are soluble in water, form reversible jellies and dry to a soluble condition, is separated from that of the hitherto known urea-formaldehyde condensation products capable of being hardened. Compounds which are capable of being hardened are not within the scope of this invention.

By observing the fundamentals set forth in 1–5 above, as will be seen from the examples herein, it is possible for the first time to produce synthetically the colloid-chemical properties of many natural products. Thus there may be produced products having the properties of gum arabic, animal glue, agar-agar or the like.

In many cases these synthetically produced products are superior to the natural products. It is known that the adhesive power of animal glue decreases with increased duration of heating since the acid amide-like union in this natural product permits an easy hydrolysis, while the methylene compounds of these synthetic products have a practically almost unlimited durability.

Among the natural jelly formers agar-agar has a special position because this jelly has a particularly high softening point, between 40–45° C. As compared herewith there can be made by this invention synthetic reversible products which soften at 60–70° C. In this matter of the softening point jellies may be made which solidify very rapidly or very slowly, which in some circumstances determines their usefulness in various processes.

The gelatinizing power of these synthetic jellies may vary as desired; there can be obtained compounds which gelatinize even in strongly diluted solutions or only at high concentration.

Finally, there may be made soluble products of very high or very low viscosity, which may be of varying importance according to the prevailing conditions for their application as adhesives or as dressing agents.

A further advantage of these synthetic products as compared with natural products is that they can be obtained completely colorless, particularly when too high a condensation temperature is avoided.

It is frequently advantageous to condense the urea in admixture with other substances capable of reacting with formaldehyde, such as thiourea, phenol, acetamide, analine or the like. Mostly the gelatinizing tendency is increased by such an addition. In many cases, for instance in the case of thiourea, caution must be observed in respect of the proportion added, since when this is too high, under conditions which in the case of urea alone would yield reversible jellies, the mixture yields irreversible jellies.

In some circumstances it may be advantageous to condense the urea in presence of a natural product, such as animal glue, starch, gum arabic or the like.

In many cases it is advantageous, for example, when the materials to be dressed or sized are not compatible with an acid reaction, to neutralize wholly or in part the condensation product after it has attained its desired condition.

The gelatinized products thus obtained may be stored in layers after their condensation at a temperature of 70–90° C. until they become easily comminuted in the cold which may occupy one or more hours according to the thickness of the layer. It may be preferred to market the gelatinized products in the form of powder, with or without a small content of water, since such powders may be brought into solution ready for use by stirring them with the desired quantity of water and heating the mixture on the water-bath for a few minutes. However, the gelatinized products may be marketed in other forms, for instance in the form of cubes, tablets spheres or the like. A prolonged swelling must precede the production of a solution from such camparatively thick pieces.

When products as free from water as possible are to be marketed they may be dried at 70–90° C. The drying is more rapid when conducted in a current of warm air or in a vacuum.

Heating on the water-bath is the best mode of aiding dissolution of the jellies in water. By heating directly with an open flame or other similar unsuitable device partial superheating occurs in the highly viscous liquid and may lead to undesired decomposition. Such gelatinous solutions may practically be remelted as often as desired without damage to their adhesive power.

According to their properties these products may be applied for various purposes.

Those which remain soluble may be used for gumming paper or pasteboard; for textile purposes, for instance for stiffening and dressing fabrics of all kinds; as protective colloids, for instance, for protecting plants; as dispersing agents for making emulsions or suspensions. The gelatinized masses are applicable for gluing wood; for cementing sheets of glass for the purpose of making safety glass; the sheets cemented together with these products and dried are quite fast to light, completely colorless and clear and have little tendency to splinter. Pieces of wood glued together by these synthetic products have an extraordinarily strong adhesion at the parts glued. It is not possible to tear apart the pieces at the glued joints.

The following examples illustrate the invention: in all of them the formaldehyde used is a solution of 40 per cent. strength by volume (the relationship between parts by weight and parts by volume is that which exists between the kilo and the litre):—

Example 1

0.833 mol. hexamethylenetetramine is formed from 250 parts by volume of ammonia of 22.7 per cent. strength by volume and 375 parts by volume of formaldehyde. When the strongly exothermic reaction has diminished the solution is mixed with 150 parts by weight of urea and 244 parts by volume of formaldehyde and 2.5 parts by weight of oxalic acid dissolved in the formaldehyde. The solution is evaporated at the boil in an open vessel and, while stirring, until it weighs 465 parts. When cool it has become a pasty, colorless, milky mass still capable of being spread and soluble in water in every proportion. The mass does not lose its solubility even after further heat-treatment or when stored for a long time. The proportion between hexamethylenetetramine and urea is 1 mol. to 3 mol. The proportion between urea and formaldehyde is 1 mol. to 1.3 mol. The mass is suitable for adhesive and dressing purposes.

Example 2

0.5 mol. hexamethylenetetramine is formed from 150 parts by volume of ammonia of 22.7 per cent. strength by volume and 225 parts by volume of formaldehyde. After diminution of the exothermic reaction there are introduced into the solution 150 parts by weight of urea and 244 parts by volume of formaldehyde which contains in solution 2.5 parts by weight of oxalic acid and the whole is evaporated to 420 parts by weight. There is produced a thick, viscous, colorless, slightly turbid liquid, which may be used in the manner described in Example 1. The proportion between hexamethylenetetramine and urea is 1 mol. to 5 mol. The proportion between urea and formaldehyde is 1 mol. to 1.3 mol.

Example 3

60 parts by weight of urea, 28 parts by weight of hexamethylenetetramine, 1.5 parts by weight of oxalic acid and 112.5 parts by volume of formaldehyde are heated together to boiling in a reflux apparatus for 1 hour. After cooling, the mass is feebly yellowish, highly viscous, but still capable of being spread; it has the property of permanent solubility. It is applicable for the purposes named in Example 1. The proportion between hexamethylenetetramine and urea is 1 mol. to 5 mol., and the proportion between urea and formaldehyde is 1 mol. to 1.5 mol.

Example 4

60 parts by weight of urea, 47 parts by weight of hexamethylenetetramine and 120 parts by volume of formaldehyde are heated together without a catalyst at 60–70° C. for 2½ hours. There is produced a very thin, viscous liquid which deposits a whitish matter. If the condensation is conducted in the presence of an acid catalyst at 60° C., there is obtained in contrast with this thin, viscous, depositing product of poor quality, a jelly which is already fusible in reversible manner as described in Example 7. The proportion between hexamethylenetetramine and urea is 1 mol. to 3 mol. The proportion between urea and formaldehyde is 1 mol. to 1.6 mol.

Example 5

90 parts by weight of urea, 70 parts by weight of hexamethylenetetramine and 225 parts by volume of formaldehyde in which 3 parts by weight of oxalic acid are dissolved, are together heated to boiling in a reflux apparatus for 2½ hours. After cooling, there is formed a yellow jelly which melts easily, always in a reversible manner. The proportion between hexamethylenetetramine and urea is 1 mol. to 3 mol. The proportion between urea and formaldehyde is 1 mol. to 2 mol.

Example 6

60 parts by weight of urea, 28 parts by weight of hexamethylenetetramine and 127.5 parts by volume of formaldehyde containing in solution 2 parts by weight of oxalic acid are heated together for 1¾ hours at 60–70° C. There is produced a quite colorless jelly, easily melting in reversible manner and excellently suitable for gluing wood and uniting glass plates. The proportion between hexamethylenetetramine and urea is 1 mol. to 5 mol. and the proportion between urea and formaldehyde is 1 mol. to 1.7 mol. The product may be dried without losing its properties, without addition of heat or while heating at a temperature of 70–90° C.; most advantageously, however, by blowing warm air over the comminuted material.

Example 7

60 parts by weight of urea, 47 parts by weight of hexamethylenetetramine and 120 parts by volume of formaldehyde containing 4 parts by weight of oxalic acid in solution are heated together for 2½ hours to 60° C. There is produced a quite colorless, rapidly solidifying jelly, melting always in a reversible manner and suitable for gluing wood and for uniting glass plates. This mass differs very advantageously from that made as described in Example 4, this difference being attributable to the action of the catalyst. The proportion between hexamethylenetetramine and urea and between urea and formaldehyde is the same as that given in Example 4. The product can be dried with or without application of heat without losing its solubility.

Example 8

30 parts by weight of urea, 70 parts by weight of hexamethylenetetramine and 8 parts by weight of oxalic acid dissolved in 67.5 parts by volume of formaldehyde are heated together for 2¾ hours at 60–70° C. After cooling, there is formed a quite colorless jelly, melting always in a reversible manner and becoming turbid when dry owing to the separation of crystalline matter. The product may be dried with or without application of heat without loss of its solubility. The proportion between hexamethylenetetramine and urea is 1 mol. to 1 mol. and the proportion between urea and formaldehyde is 1 mol. to 1.8 mol.

Example 9

120 parts by weight of urea, 56 parts by weight of hexamethylenetetramine and 5 parts by weight of oxalic acid dissolved in 232.5 parts by volume of formaldehyde are heated together for 3 hours at 60–70° C. The mass is now kept in the form of a compact layer in a drying oven at a temperature of 70–90° C. until there is formed a jelly stable under heat. When cold this mass is reduced to powder in a suitable machine and in this form may be brought to market; it still contains some combined water, from which it may be freed, if necessary, by treatment with warm air. The powder thus obtained is stirred with 200 parts by volume of water and the suspension is heated on the water-bath. In a few minutes a thin, viscous liquid is produced, which solidifies to a jelly only very slowly, because the proportion of formaldehyde for producing a rapidly drying jelly has not been used. The proportion between hexamethylenetetramine and urea is 1 mol. to 5 mol. and the proportion between urea and formaldehyde is 1 mol. to 1.55 mol.

Example 10

60 parts by weight of urea (1 mol.), 20 parts by weight of hexamethylenetetramine (1/7th mol.) and 120 parts by volume of formaldehyde (1.6 mol.) containing 1.5 parts by weight of oxalic acid in solution are heated together for 1¾ hours at 60–70° C. The solution has first an alkaline reaction but after waiting for a little time the reaction becomes acid, which is an indication that the hexamethylenetetramine has been absorbed in the formation of the condensation molecule. To the acid solution there are added 5 parts by weight of hexamethylenetetramine; after some heating the solution becomes again acid, whereupon there are added a further 6 parts by weight of hexamethylenetetramine and the whole is further heated for a short time until the development of acid reaction. The mass treated as described in Example 9 yields, when melted with 70 parts by weight of water, a reversible jelly suitable for wood and glass. When all hexamethylenetetramine has been added the proportion of this to the urea is 1 mol. to 4 mol.

Example 11

60 parts by weight of urea (1 mol.), 28 parts by weight of hexamethylenetetramine (⅕ mol.) and 2 parts by weight of oxalic acid, dissolved in 135 parts by volume of formaldehyde (1.8 mol.) are together treated in the manner described in Example 9. With 130–150 parts by weight of water there is produced a very rapidly solidfying jelly in large yield. The heated solution solidifies again at 56° C. to a reversible jelly, this temperature being essentially high as compared with agar-agar jelly. The composition being otherwise similar to that of the product of Example 10 this rise of the temperature of solidification is to be attributed to the increase of hydrogen-ion concentration.

Example 12

60 parts by weight of urea (1 mol.), 28 parts by weight of hexamethylenetetramine (⅕ mol.), 9.4 parts by weight of phenol (1/10 mol.) and 124 parts by volume of formaldehyde (1.65 mol.), containing 4 parts by weight of oxalic acid in solution, are heated together at 60–70° C. for 1¾ hours. There is obtained a jelly which solidifies extremely quickly; even when diluted with an equal volume of water the solution obtained at 90° C. solidifies already at 65° C. to a reversible jelly.

Example 13

60 parts by weight of urea (1 mol.), 28 parts by weight of hexamethylenetetramine (⅕ mol.), 8.8 parts by weight of urethane (1/10 mol.) and 3 parts by weight of oxalic acid dissolved in 123 parts by volume of formaldehyde are together treated in the manner described in Example 9, whereby a good, useful jelly is obtained. For the 1/10 mol. of urethane there may be substituted 1/10 mol. acetamide, formamide or oxamide.

If thiourea is used in admixture with urea the addition of 1/10 mol. of thiourea to 1 mol. of urea in the presence of an acid catalyst produces directly a jelly which is no longer reversible with certainty. It is necessary therefore to diminish the proportion to 1/20 mol.

Example 14

60 parts by weight of urea, 28 parts by weight of hexamethylenetetramine, 1.5 parts by weight of oxalic acid, dissolved in 120 parts by volume of formaldehyde, and 9 parts by weight of gum arabic are together treated in the manner described in Example 9, whereby a similar jelly is obtained.

Example 15

60 parts by weight of urea, 28 parts by weight of hexamethylenetetramine, 1.5 part by weight of oxalic acid, dissolved in 124 parts by volume of formaldehyde, and 6 parts by weight of starch flour are together treated in the manner described in Example 9. The heating in the drying oven must be somewhat prolonged in order to obtain a product which can be comminuted when cold. With 100 parts by weight of water a jelly well adapted for gluing wood is obtained.

Example 16

60 parts by weight of urea, 28 parts by weight of hexamethylenetetramine, 1.5 parts by weight of oxalic acid, dissolved in 112 parts by volume of formaldehyde, and 3 parts by weight of animal glue are together treated in the manner described in Example 9 and the product worked up in like manner.

Example 17

450 parts by weight of urea (7½ mol.), 190 parts by weight of thiourea (2½ mol.) and 94 parts by weight of hexamethylenetetramine (⅔ mol.) are dissolved in 500 parts by volume of formaldehyde of 30 per cent. strength (5 mol.). To the solution 4 parts by weight of oxalic acid are added. The mixture is then subjected to condensation by heating to a temperature of 60 to 70° C. for some hours. During condensation advantageously some water is distilled off. There is obtained a clear syrup completely soluble in water.

The present invention is of course not limited to the use of urea itself or of mixtures of urea with the above mentioned other compounds capable of condensation with formaldehyde, but is meant to include the use of any derivative of urea which acts in the same or analogous manner as this latter under the herein described conditions. The term "formaldehyde" is intended to include also the polymers of formaldehyde.

What I claim is:—

1. As a new article of manufacture a non-hardening condensation product of urea, formaldehyde and hexamethylenetetramine useful as a glue, stiffening agent and the like, containing the constituents of not more than 10 molecules of urea for each molecule of hexamethylenetetramine and for each molecule of urea a proportion of formaldehyde ranging substantially between 1 and 2 molecules.

2. As a new article of manufacture a non-hardening condensation product of urea, formaldehyde and hexamethylenetetramine useful as a glue or stiffening agent and the like and obtained by the interaction of the components at a hydrogen-ion concentration higher than that corresponding with a pH-value of 3 measured in the initial formaldehyde and in such proportion that for each molecule of hexamethylenetetramine not more than 6 molecules of urea and for each molecule of urea a proportion ranging substantially between 1 and 2 molecules of formaldehyde is present.

3. As a new article of manufacture a non-hardening condensation product of formaldehyde, hexamethylenetetramine and a mixture of urea with another compound capable of condensation with formaldehyde selected from the group thiourea, phenol, acetamide, oxamide, urethane, aniline, useful as a glue or stiffening agent and the like and obtained by the interaction of the components in such proportion that the sum of molecules employed of the mixture of urea and other compound capable of condensation with formaldehyde is not more than 10 for each molecule of hexamethylenetetramine and that for each molecule of said mixture of urea and other compound capable of condensation with formaldehyde a proportion ranging substantially between 1 and 2 molecules of formaldehyde is present.

4. In a process for the manufacture of condensation products from urea, formaldehyde and hexamethylenetetramine, the step of reacting the said components with each other in such proportions that there are present for each molecule of hexamethylenetetramine not more than 10 molecules of urea, and for each molecule of urea a proportion of formaldehyde ranging substantially between 1 and 2 molecules, whereby non-hardening condensation products are obtained.

5. In a process for the manufacture of condensation products from urea, formaldehyde and hexamethylenetetramine, the step of reacting the said components with each other at a hydrogen ion concentration which is higher than that corresponding to a pH value of 3 measured in the initial formaldehyde and in such proportions that for each molecule of hexamethylenetetramine there are used not more than 6 molecules of urea, and for each molecule of urea a proportion of formaldehyde ranging substantially between 1 and 2 molecules, whereby non-hardening condensation products are obtained.

6. In a process for the manufacture of condensation products from formaldehyde, hexamethylenetetramine and a mixture of urea with another compound capable of condensation with formaldehyde selected from the group consisting of thiourea, phenol, acetamide, oxamide, urethane and aniline, the step of reacting the said components with each other in such proportions that the sum of the molecules employed of the mixture of urea and other compound capable of condensation with formaldehyde is not more than 10 for each molecule of hexamethylenetetramine and that for each molecule of said mixture of urea and said other compound capable of condensation with formaldehyde a proportion ranging substantially between 1 and 2 molecules of formaldehyde is present.

WILHELM KRAUS.